United States Patent [19]

Kassebaum

[11] Patent Number: 5,129,243
[45] Date of Patent: Jul. 14, 1992

[54] ROTARY SECURITY LOCK APPARATUS FOR GLADHAND BRAKE LINE COUPLERS

[76] Inventor: Larry A. Kassebaum, 12554 Warbler Ave., Grand Terrace, Colton, Calif. 92324

[21] Appl. No.: 681,316
[22] Filed: Apr. 4, 1991
[51] Int. Cl.⁵ .............................................. E05B 73/00
[52] U.S. Cl. ................................ 70/14; 70/19; 70/57; 70/160; 70/237; 303/69
[58] Field of Search .................. 70/14, 237, 57, 258, 70/19, 166–169; 280/507; 292/204; 303/69 X; 285/69, 72, 79

[56] References Cited

U.S. PATENT DOCUMENTS

| | | | |
|---|---|---|---|
| 1,619,464 | 3/1927 | Eichhorn | 285/69 |
| 2,048,353 | 7/1936 | Rose | 303/86 |
| 3,004,421 | 10/1961 | Bowler | 70/14 |
| 3,052,489 | 9/1962 | Stoudt | 285/69 |
| 3,226,133 | 12/1965 | Geresy | 70/237 |
| 3,240,537 | 3/1966 | Valentine | 303/89 |
| 3,285,672 | 11/1966 | Avrea | 303/9 |
| 3,631,896 | 1/1972 | Meigs | 70/14 |
| 3,674,321 | 7/1972 | Fontaine | 303/9 |
| 3,880,477 | 4/1975 | Stevenson | 303/89 |
| 3,884,055 | 5/1975 | Vuillemot | 70/58 |
| 3,892,431 | 7/1975 | Booth | 285/79 |
| 3,944,295 | 3/1976 | Lloyd | 303/89 |
| 3,973,805 | 8/1976 | Stevenson | 303/9 |
| 3,977,221 | 8/1976 | Foote | 70/58 |
| 4,039,202 | 8/1977 | Bamettler | 70/232 |
| 4,226,103 | 10/1980 | Strickland | 70/14 |
| 4,325,237 | 4/1982 | Menzie | 70/14 |
| 4,543,984 | 10/1985 | Murray | 137/385 |
| 4,693,096 | 9/1987 | Mercer | 70/14 |
| 4,738,126 | 4/1988 | Haberle | 70/14 |
| 4,747,623 | 5/1988 | Newcomb | 285/69 |

FOREIGN PATENT DOCUMENTS

| | | | |
|---|---|---|---|
| 579335 | 7/1959 | Canada | 285/69 |
| 2210343 | 6/1989 | United Kingdom | 70/237 |

Primary Examiner—Renee S. Luebke
Assistant Examiner—D. M. Boucher
Attorney, Agent, or Firm—Fulwider, Patton, Lee & Utecht

[57] ABSTRACT

A security lock apparatus for engagement with and locking on a break line coupler of the type having a housing with a central seal, a tongue projecting laterally in one direction and a crown mounted on the opposite side thereof and formed with a turned back cap defining a downwardly opening groove. A lock body is formed with an under surface defining a seat for overlying the seal and having a downwardly depending flange formed on one side thereof with a turned back rim defining an opened ended track for receipt of such tongue. Projecting from the opposite side of such body is a rail formed with an upturned arcuate rib for sliding receipt in the groove. The rail, rim and seat are configured and arranged such that the body may be positioned with the seat overlying the seal and in a rotational position relative to the coupler so that such rail and rim are clear of the respective cap and tongue and to then allow for rotation of the body relative to the coupler to orbit such rail and rim into engagement under the respective cap and tongue to be held securely in position. A lock is mounted in the body and is operable to extend a plunger therefrom to engage one end of the tongue to limit relative rotation between the body and coupler to thereby maintain the body in its locked position.

10 Claims, 4 Drawing Sheets

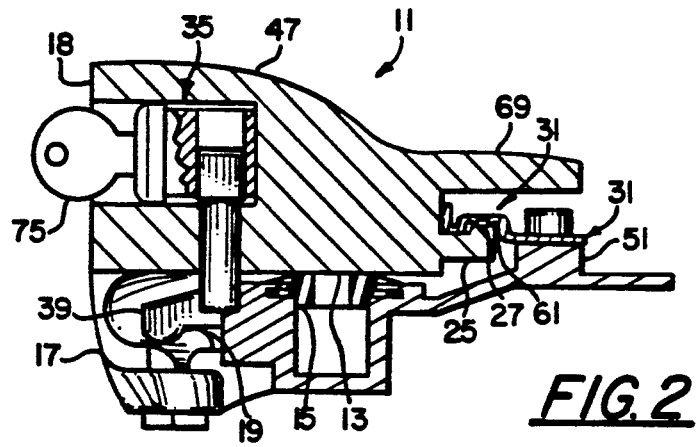
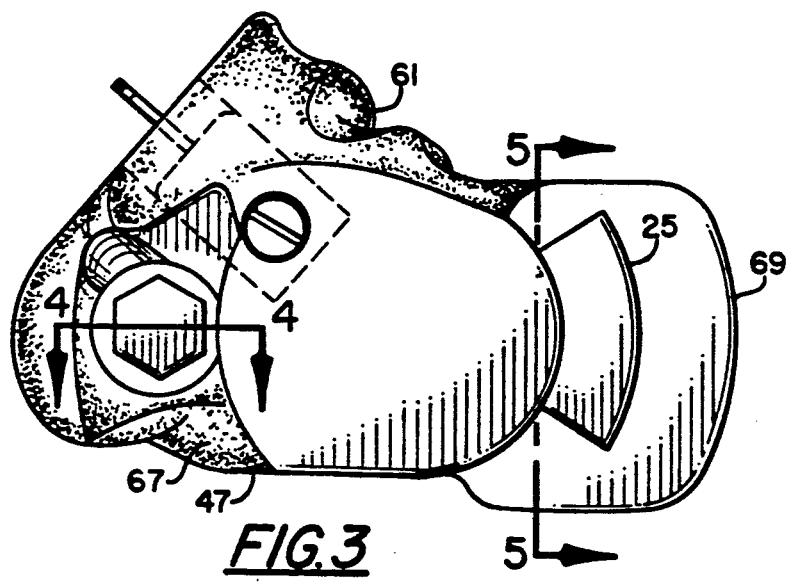
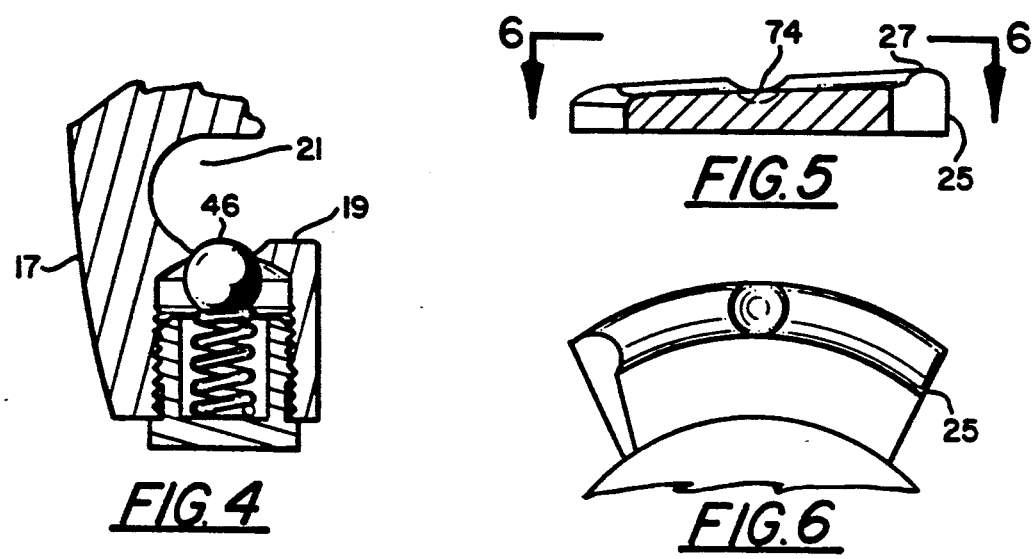

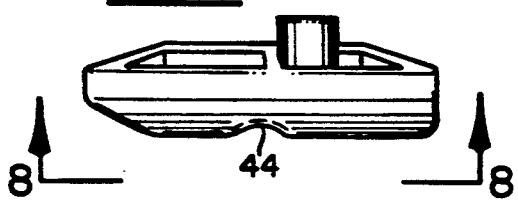
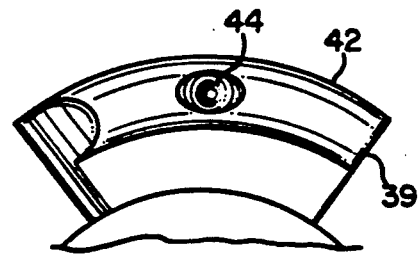
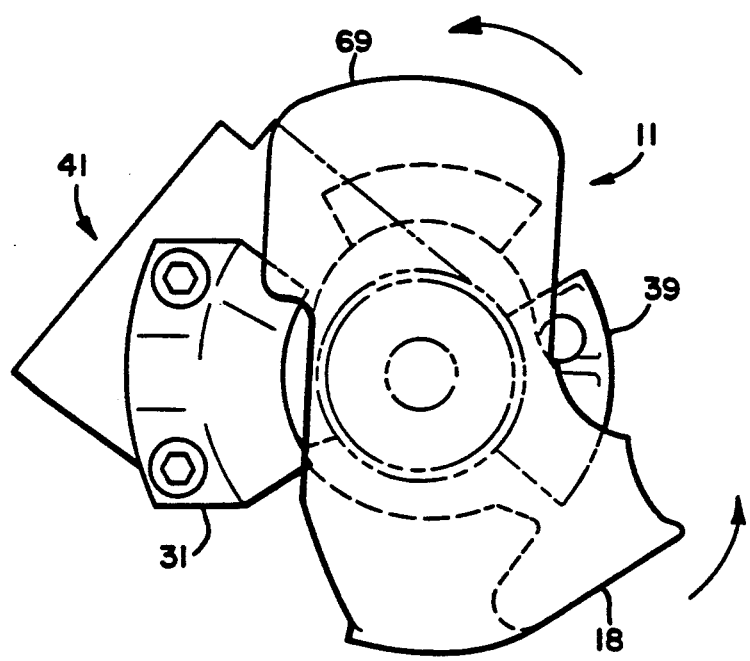
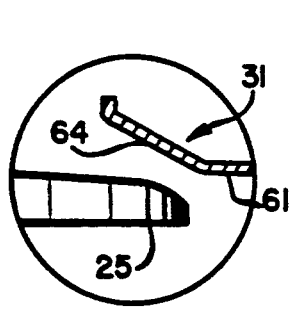
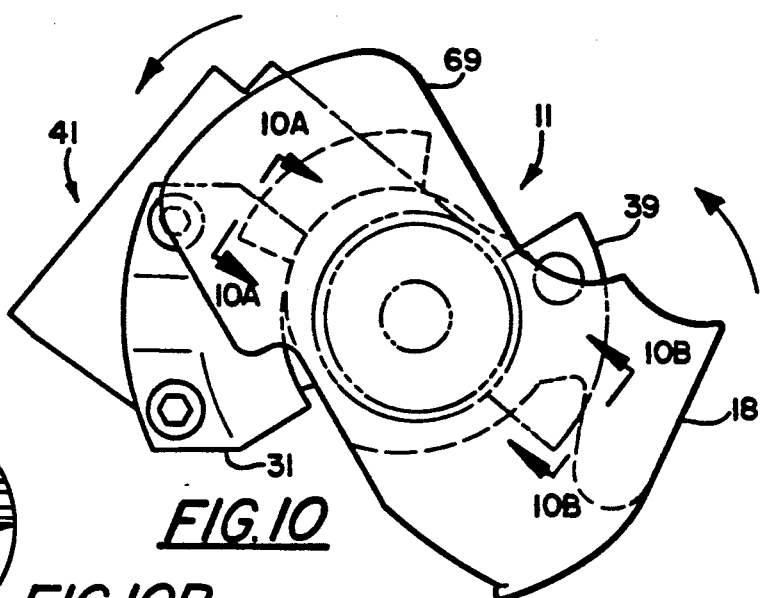
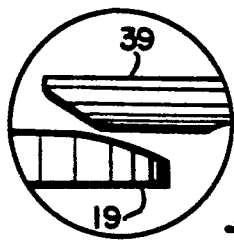

ROTARY SECURITY LOCK APPARATUS FOR GLADHAND BRAKE LINE COUPLERS

BACKGROUND OF THE INVENTION

1. Field of the Invention

The present invention relates to a security locking device for a gladhand air brake system for a truck trailer.

2. Description of the Prior Art

Modern day truck trailers are equipped with air actuated brake systems which typically rely on compressed air supplied from the tractor. Consequently, when the trailer is disengaged from the truck, the brakes remain in their locked position thus securing the trailer against movement.

By current practices, loaded trailers are frequently left unattended, either in a staging or storage area or even at a scheduling stop. Such trailers are often loaded with extremely valuable cargo thus raising the temptation for theft when left unattended.

The mechanical hitching together of a truck tractor to a trailer is typically achieved by what is sometimes referred to as a fifth wheel for the mechanical connection and then air hoses are coupled together to supply compressed air to the trailer brake system for the purposes of operation thereof. These coupling devices are typically referred to in the trade as gladhand couplers. Such coupling devices have more or less of a general overall universal design such that numerous different trucks may be utilized to haul different trailers.

The unauthorized taking of a trailer loaded with cargo is facilitated by the fact that a tractor may be readily and quickly backed up and hitched to a trailer, the gladhand couplers coupled together and the brakes thereof released to ready the trailer for operation. Thus, unauthorized persons may surreptitiously tow away an unattended trailer and unload and dispose of the cargo before the whereabouts of that trailer may be traced by the authorities. Consequently, there exists a need for a security mechanism which will secure a gladhand trailer coupler against unauthorized mating with a trailer coupler. This need has led to proposal of several different designs.

One such device proposes the use of a lock cylinder insertable directly into the opening for the air passage to block access thereto. The cylinder then incorporates radially extendable locking fingers which extend to lock the cylinder in place. A device of this type is shown in Menzie U.S. Pat. No. 4,325,327. Devices of this type, while serving to block access, suffer the shortcoming that the cylinder lock is intrusive in that it creates a danger of causing damage to the seal and, further, is limited in application to different sizes and configurations of seals and does not form a sealing engagement therewith to prevent entry of debris.

Another such prior art coupling device takes advantage of the fact that the gladhand includes a generally cylindrical housing formed with a central air passage and having a tongue projecting from one side thereof and a crown mounted on the opposite side thereof and turned upwardly and backwardly to form a cap. The security lock itself is formed on one side with a so-called tongue for receipt under the cap and on the other side with a down turned flange formed with a horizontally extending slot which is in intended for receipt of the aforementioned coupling tongue. A lock cylinder is then mounted centrally in the body of the security lock and is arranged such that the security lock itself may be slid bodily in a diametrical direction to engage the opposite side thereof with the coupler housing and allow for the lock plunger to be extended into the air passage.

A device of this type is shown in Strickland U.S. Pat. No. 4,226,103. Such an arrangement, while satisfactory for some applications, suffer the shortcoming that the security lock is difficult to install and the lock plunger intrudes directly into the air passage, thus limiting the universality of the security lock and presenting a danger that such plunger might do damage to the air passage. Moreover, in order to allow for installation of this device, the tolerances must be relatively loose thus resulting in the security lock itself being relatively loose upon installation thereof thereby leaving a substantial degree of looseness between the components resulting in a space being left into which pry tools or the like may be inserted. Of greater importance is the fact that such devices do not provide a positive seal to block entry to the air passage thus leaving an unsealed opening for entry of debris which tends to clog filters or otherwise contaminate the brake system.

SUMMARY OF THE INVENTION

The gladhand security lock apparatus of the present invention is characterized by a housing formed with a seat which engages a gladhand coupler air passage seal and includes oppositely projecting screw-like locking elements for engagement with corresponding screw elements incorporated in the gladhand coupling. Included is a hand grasp which allows for the operator to grasp the apparatus and twist it into locking relation on such coupler.

Other objects and features of the invention will become apparent from consideration of the following description taken in connection with the accompanying drawing.

BRIEF DESCRIPTION OF THE DRAWINGS

FIG. 2 is a vertical sectional view taken along the lines 2—2 of FIG. 1;

FIG. 3 is a bottom plan view of the security lock shown in FIG. 2 but detached from the gladhand coupler; and FIG. 4 is a longitudinal sectional view, in enlarged scale, taken along the line 4—4 of FIG. 3;

FIG. 5 is a transverse sectional view, in enlarged scale, taken along the line 5—5 of FIG. 3;

FIG. 6 is a partial bottom plan view, taken along the line 6—6 of FIG. 5;

FIG. 7 is a partial end view, in enlarged scale, of the coupler shown in FIG. 1 and taken along the line 7—7 of FIG. 1;

FIG. 8 is a partial bottom view taken along the line 8—8 of FIG. 7;

FIG. 9 is a top plan view, in reduced scale, of the gladhand security lock apparatus shown in FIG. 1;

FIG. 10 is a top plan view similar to FIG. 9 but showing the security lock apparatus rotated relative to the gladhand coupler;

FIG. 10A is a transverse sectional view, in enlarged scale, taken along the line 10A—10A of FIG. 10;

FIG. 10B is a transverse sectional view, in enlarged scale, taken along the line 10B—10B of FIG. 10;

DESCRIPTION OF THE PREFERRED EMBODIMENT

Figure 1:
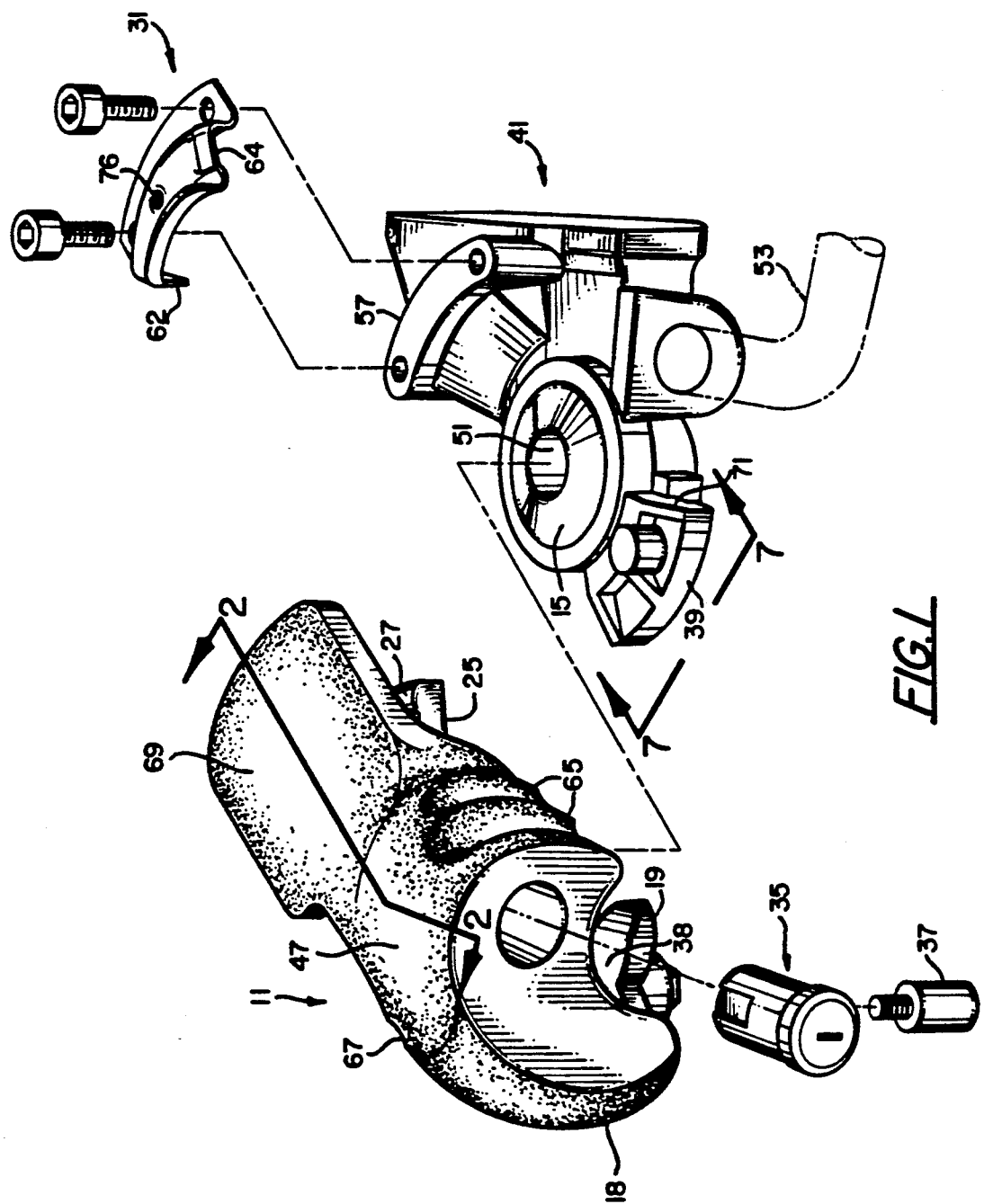
FIG. 1 is an exploded perspective view of a gladhand security lock apparatus for locking on a gladhand coupler and incorporating the present invention.

The gladhand security apparatus of the present invention includes, generally, a lock body 11 which is formed on its underside with a seat 13 which overlies a seal 15 in the gladhand coupling, a downwardly depending flange 17 which turns radially inwardly to form a screw thread rim 19 cooperating with the underside of the body to define a radially inwardly opening track 21. The body 11 is formed on the diametrically opposite side with an arcuate rail 25 incorporating an annular screw thread rib 27 received under a cap 31. A lock device, generally designated 35, incorporates a downwardly extendable telescoping plunger 37 which is adapted to engage one end of a tongue 39 incorporated in the coupler, generally designated 41, to thus block relative rotation of such lock body 11. A hand grasp 47 is formed in the top of the security lock body 11 for grasping by the user so that the seat 13 may be positioned on the seal 15 and the lock body 11 rotated into position to orbit the rim under the tongue 39 and rail 25 under the cap 31. The lock device 35 may then be actuated to extend the plunger 37 to lock the security lock against rotation thereof for disengagement.

Conventional couplers 41 are typically mounted on a rigid gladhand arm (not shown) mounted on a truck trailer. A mating gladhand coupling is then carried from the trailer and may be connected therewith to lock the couplings together.

Referring to FIG. 1, the coupler 41 is in plan view of generally circular construction and incorporates a central annular seal 15 having a central air passage 51 which may be connected with an air hose 53 leading to the brake actuator. The coupler then incorporates a radial flange segment which defines the tongue 39. Referring to FIGS. 1, 7 and 8, the tongue 39 is typically formed on its bottom side with a peripheral arcuate rim 42 which is, in turn, formed with a central ball detente 44. Disposed on the side of the coupler diametrically opposite side of the tongue 39 is a crown 57 which mounts thereon the cap 31. The cap 31 is fan shaped in plan view (FIG. 1) and formed with a raised annular rib open on its underside to form a downwardly opening annular groove 61. Such cap is formed on one end with a down turned flap defining a stop 62 at one end of the groove. Formed at the opposite open end of such groove is an upwardly sloped ramp 64 that serves to engage and lead the rib 27 of the rail 25 slidingly into the groove 61. Formed centrally in such groove is a downwardly depressed dimple 76.

The security lock apparatus may be of cast or molded construction and is preferably constructed of tough plastic. The body 11 is formed in somewhat of a semi-cylinder, flat on the bottom side to form the seat 13 (FIG. 2) and formed with finger receiving grooves 65 disposed on one side of the cylindrical shape and a thumb receiving groove 67 on the opposite side thereof. The longitudinal dimension of the body affords an axial dimension shaped for convenient purchase by the hand of the user for manually applying torque thereto. A planar guard plate 69 projects from the back end thereof and, in the assembled configuration, overlies the cap 31 to block access thereto.

Figure 11:
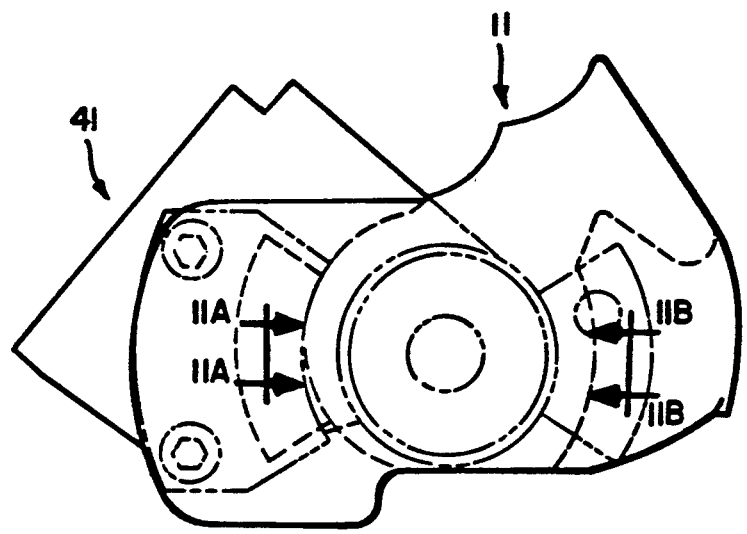
FIG. 11 is a top plan view similar to FIG. 10 but depicting the lock apparatus further rotated relative to the gladhand coupler.
Figure 11A:
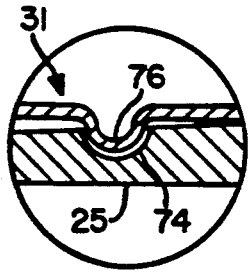
FIG. 11A is a transverse sectional view, in enlarged scale, taken along the line 11A—11A of FIG. 11.
Figure 11B:
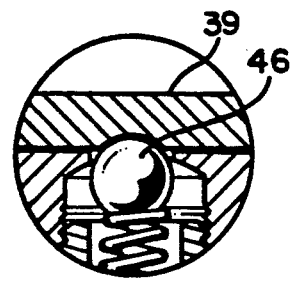
FIG. 11B is a transverse sectional view, in enlarged scale, taken along the line 11B—11B of FIG. 11.

Referring to FIG. 2, the body 11 is configured on its front side with a formed end 18 and an annular flange 17 depending downwardly therefrom to turn inwardly to form the annular screw thread rim segment 19 which, in practice, cooperates to define the radially inwardly opening track 21. The track is open on one annular end 38 for receipt of the radially projecting tongue 39 and is closed on the opposite end to block access thereto. Mounted centrally in the rim 19 is a spring loaded ball 46 (FIG. 4) biased upwardly and arranged to register with the detente 44 when the lock is in its locked position. The rail 25 projecting from the back end of the body 11 beneath the plate 69 is formed on its top side (FIG. 5) with the rib 27 which is inclined to define a ramp to engage grooves of the cap 31 and draw the body 11 downwardly on the seal 15 upon rotation thereof. The rib 27 is formed centrally with an upwardly opening detente 74 (FIGS. 5 and 11A).

The lock device 35 may be in the form of a key lock, a tumbler lock or digital lock actuated by a receiver under command of a remotely located transmitter. The plunger 37 is located directly over one end 71 of the tongue 39 such that extension thereof places it in position to block rotation of the body 11 relative to the coupling 41.

In practice a trucking company will typically supply each of its drivers with one or more of the security locks which may be carried in the truck tool box and may be readily applied to a gladhand coupling 41 when a trailer is left unattended.

In operation, when the locking apparatus is to be applied to the coupling 41, the body 11 may be positioned such that the rim 19 and rail 25 are out of alignment with the respective tongue 39 and cap 31. With the seat 13 placed on the surface of the seal 15, the user may grasp the hand grasp 47 by placing two fingers in the finger grooves 65 and his thumb in the thumb groove 67. With such purchase on the hand grasp, the security lock may then be bodily rotated to orbit the rim 19 and rail 25 to slide them into position underneath the respective tongue 39 and cap 31.

This will serve to drive the rim 19 under the tongue 39 and the rib 27 under the cap 31. The slope of the rib 27 (FIG. 5) will act as a ramp to drive the body 11 downwardly to press the seat 13 against the seal 15 (FIG. 2) to partially compress and establish positive sealing engagement. The ball detente 44 will be brought into position over the spring loaded ball 46 while the detente 74 is brought into position under the dimple 76 to thus act as an index alerting the operator to the fact that the apparatus is in full sealing position ready to be locked. By then merely turning the key 75 of the lock device 35, the plunger 37 will be extended to engage the end 71 of the tongue 39 thus locking the security device in its captive position blocking access to the air passage 51 and sealing the seat 13 against the surface of the seal 15.

It will be appreciated that in practice the rim 19, seat 13 and rail 25 and associated rib 27 are so configured and located that as the body 11 is rotated into its secure position, compressive forces are applied to the seat 15 to thereby generate a tight seal to seal against entry of dust and debris. In so doing, it will be appreciated that some degree of torque must be applied to the body 11, which torque may conveniently be applied manually because of the size of the hand grasp 47 and axial extent thereof.

When locked into position, the security lock is held in place by relatively sturdy components and the guard plate 69 overlies the cap 31 to thus block ready access thereto by an unauthorized individual. Consequently, the gladhand coupler is securely locked until relocation of the trailer is to be made by an authorized individual having a key 75 or combination to the lock or is in position of a transmitter properly coded for actuation of any receiver mounted therein.

From the foregoing it will be appreciated that the security lock apparatus of the present invention is economical to manufacture and will readily mate with conventional gladhand couplers without the danger associated with intrusion directly into the air passage 51 or penetration downwardly within the seal 15.

Various modifications and changes may be made with regard to the foregoing detailed description without departing from the spirit of the invention.

What is claimed is:

1. Security lock apparatus for engagement with and locking on a brake line coupler formed with a housing having a central upwardly opening air passage surrounded by an upwardly facing annular seal having a central axis, including on one side a tongue projecting in one lateral direction and on the opposite side an upstanding crown having a turned back cap formed with a downwardly facing annular open ended groove and comprising:
    a lock body overlying such seal, formed with an under surface defining a downwardly facing seat defining a closure for seating on said seal and having oppositely disposed first and second sides;
    a depending circular flange on said first side of said body projecting downwardly and formed with an inturned screw thread rim segment spaced downwardly below the plane of said seat to define an annular track, said track being open on one end for receipt thereon of said tongue;
    an annular rail projecting from said second side of said body and formed with an annular screw thread rib segment slidably received in such open ended groove from the open end thereof;
    a plunger mounted on said body and extendable therefrom to engage said housing to restrict rotation of said body relative to such housing;
    a cylindrical lock device for locking said plunger in its extended position and including a release element; and
    hand grasp means on said body for being grasped by a user's hand to apply a torque to said body for rotation thereof about such central axis such that said seat may be positioned on such seal with said body rotated to dispose said rim and rib segments out of alignment with said tongue and cap, respectively, said hand grasp means then grasped by the user's hand to orbit said body to drive said rib segment into such groove and said rim segment under such tongue and said security lock actuated to drive said plunger into engagement with said housing to thereby lock said body against rotation relative thereto to block access to said passage by unauthorized persons.

2. A security lock apparatus as set forth in claim 1 that includes:
    a guard plate projecting from said body and disposed in covering relation over said cap.

3. A security lock apparatus as set forth in claim 1 wherein:
    said hand grasp means includes peripheral groove means configured for complemental receipt on one side of at least two fingers of the user's hand and on the opposite side with groove means for receipt of the thumb.

4. A security lock apparatus as set forth in claim 1 wherein:
    said seat, rim and rib are so arranged and configured as to, when positioned with said seat on said seal, said rim under said tongue and said rail under said cap, press said seat into compressive sealing arrangement against said seal.

5. A security lock apparatus as set forth in claim 1 wherein:
    said tongue is formed on its underside with a ball detente;
    said rim includes a spring loaded ball mounted therein and located to, when said apparatus is rotated into position with said rim under said tongue and said rail under said cap, engage said detente.

6. Security lock apparatus according to claim 1 wherein:
    said lock device includes a key actuated tumbler means and said release element includes a security key for operation of said tumbler means.

7. Security lock apparatus according to claim 1 wherein:
    said body is semi-cylindrically shaped to form a semi-cylindrical periphery for convenient receipt centrally of the user's palm to dispose his or her fingers on one side of said semi-cylindrical shape and the thumb on the opposite side thereof.

8. Security lock apparatus according to claim 1 wherein:
    said body is semi-cylindrically shaped to define a longitudinal axis and includes a transversely projecting first bore intersected by a longitudinally extending second bore and wherein:
    said plunger is recessed in said first bore; and
    said security lock is received in said second bore.

9. Security lock apparatus as set forth in claim 1 wherein:
    said hand grasp means is formed with an elongated cylindrical shape having its longitudinal axis projecting perpendicularly of such central axis and includes a plurality of coextensive finger-receiving grooves projecting in one circumferential direction thereabout and a thumb-receiving groove projecting in the opposite circumferential direction whereby a user can conveniently grasp said hand grasp means with his or her fingers received in said finger-receiving grooves and his or her thumb in said thumb-receiving groove to orient the user's hand and provide purchase for applying a torque to said body for rotation thereof about such central axis.

10. Security lock apparatus as set forth in claim 9 that includes:
    a guard plate projecting axially from said body in overlying relationship with said cap to restrict direct access thereto.

* * * * *